United States Patent
Desclos et al.

(10) Patent No.: US 9,571,176 B2
(45) Date of Patent: Feb. 14, 2017

(54) ACTIVE MIMO ANTENNA CONFIGURATION FOR MAXIMIZING THROUGHPUT IN MOBILE DEVICES

(71) Applicant: Ethertronics, Inc., San Diego, CA (US)

(72) Inventors: Laurent Desclos, San Diego, CA (US); Barry Matsumori, La Jolla, CA (US); Sebastian Rowson, San Diego, CA (US); Abhishek Singh, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

(21) Appl. No.: 14/690,323

(22) Filed: Apr. 17, 2015

(65) Prior Publication Data
US 2016/0020838 A1 Jan. 21, 2016

Related U.S. Application Data

(63) Continuation-in-part of application No. 14/560,173, filed on Dec. 4, 2014, now abandoned, which is a continuation of application No. 13/674,115, filed on Nov. 12, 2012, now Pat. No. 8,928,541, which is a continuation-in-part of application No. 13/029,564, filed on Feb. 17, 2011, now Pat. No. 8,362,962, which is a continuation of application No. 12/043,090, filed on Mar. 5, 2008, now Pat. No. 7,911,402, said application No. 13/674,115 is a continuation-in-part of application No. 13/227,361, filed on Sep. 7, 2011, now abandoned.

(51) Int. Cl.
| | | |
|---|---|---|
| *H04M 1/00* | (2006.01) | |
| *H04B 7/00* | (2006.01) | |
| *H04B 7/06* | (2006.01) | |
| *H01Q 9/04* | (2006.01) | |
| *H04B 7/04* | (2006.01) | |
| *H01Q 25/04* | (2006.01) | |

(52) U.S. Cl.
CPC .............. *H04B 7/0602* (2013.01); *H01Q 9/04* (2013.01); *H04B 7/0413* (2013.01); *H04B 7/0689* (2013.01); *H01Q 25/04* (2013.01)

(58) Field of Classification Search
CPC ................................ H01Q 21/28; H01Q 25/04
USPC ...................... 455/562.1, 524, 525
See application file for complete search history.

(56) References Cited

U.S. PATENT DOCUMENTS

| | | | | |
|---|---|---|---|---|
| 5,235,343 | A * | 8/1993 | Audren | H01Q 19/28 343/816 |
| 6,496,140 | B1 * | 12/2002 | Alastalo | H01Q 3/267 342/174 |
| 6,765,536 | B2 * | 7/2004 | Phillips | H01Q 1/362 343/702 |
| 7,525,486 | B2 * | 4/2009 | Shtrom | H01Q 1/38 343/700 MS |
| 7,696,943 | B2 * | 4/2010 | Chiang | H01Q 25/002 343/757 |
| 8,948,235 | B2 * | 2/2015 | Negus | H04B 15/00 370/210 |

(Continued)

*Primary Examiner* — Tilahun B Gesesse
(74) *Attorney, Agent, or Firm* — Coastal Patent Law Group, P.C.

(57) ABSTRACT

The disclosure concerns active antenna systems, including active multi-input multi-output (MIMO) antenna systems, and radiofrequency integrated circuit modules for controlling such active antenna systems.

20 Claims, 14 Drawing Sheets

(56) References Cited

U.S. PATENT DOCUMENTS

| | | | |
|---|---|---|---|
| 9,099,780 B2 * | 8/2015 | Cheng | H01Q 1/38 |
| 9,257,755 B2 * | 2/2016 | Hsieh | H01Q 1/243 |
| 2004/0027667 A1 * | 2/2004 | Deutsch | G02B 26/0808 359/566 |
| 2005/0266902 A1 * | 12/2005 | Khatri | H04B 7/10 455/575.7 |
| 2005/0275596 A1 * | 12/2005 | Harano | H01Q 1/243 343/702 |
| 2007/0230639 A1 * | 10/2007 | Stirling-Gallacher | H04B 7/0408 375/347 |
| 2009/0312057 A1 * | 12/2009 | Moon | H01Q 1/084 455/562.1 |
| 2010/0194647 A1 * | 8/2010 | Man | H01Q 1/243 343/702 |
| 2012/0027056 A1 * | 2/2012 | Shinkai | H01Q 3/44 375/219 |

* cited by examiner

| Antenna | Mode |
|---|---|
| 1 | A1,1 |
| 2 | A2,1 |
| 3 | A3,1 |
| 4 | A4,1 |
| 5 | A5,1 |
| 6 | A6,1 |

← CONVENTIONAL ANTENNAS WITH ONE RADIATING MODE

| Antenna | Correlation | | | | |
|---|---|---|---|---|---|
| 1 | C12 | C13 | C14 | C15 | C16 |
| 2 |  | C23 | C24 | C25 | C26 |
| 3 |  |  | C34 | C35 | C36 |
| 4 |  |  |  | C45 | C46 |
| 5 |  |  |  |  | C56 |

| Antenna | Modes |
|---|---|
| A1 | A1,1; A1,2 |
| A2 | A2,1; A2,2 |
| A3 | A3,1; A3,2 |
| A4 | A4,1; A4,2 |
| A5 | A5,1; A5,2 |
| A6 | A6,1; A6,2 |

SIX MODAL ANTENNAS WITH TWO RADIATING MODES

| Antenna | Correlation | |
|---|---|---|
| A1 | C1,2,2; C1,2,3; C1,2,4; C1,2,5; C1,2,6 | |

| Antenna | Correlation | |
|---|---|---|
| A1 | C1,1,2; C1,1,3; C1,1,4; C1,1,5; C1,1,6 | C2,2,5; C2,2,6 |
| A2 | C2,1,3; C2,1,4; C2,1,5; C2,1,6 | C3,2,5; C3,2,6 |
| A3 | C3,1,4; C3,1,5; C3,1,6 | C4,2,5; C4,2,6 |
| A4 | C4,1,5; C4,1,6 | C5,2,6 |
| A5 | C5,1,6 | |

| Antenna | Modes |
|---|---|
| A1 | A1,1; A1,2; ... A1,n |
| A2 | A2,1; A2,2; ... A2,n |
| ... | ... ... ... ... |
| Am | Am,1; Am,2; ... Am,n |

← 'm' MODAL ANTENNAS WITH 'n' RADIATING MODES

| Antenna | Correlation |
|---|---|
| A1 | C1,n,2; C1,n,3; C1,n,4; ...; C1,n,m |

...; C2,n,m

| Antenna | Correlation |
|---|---|
| A1 | C1,2,2; C1,2,3; C1,2,4; ...; C1,2,m |

...

...; C2,2,m

Cm-1,n,m

| Antenna | Correlation |
|---|---|
| A1 | C1,1,2; C1,1,3; C1,1,4; ...; C1,1,m |
| A2 | C2,1,3; C2,1,4; ...; C2,1,m |
| ... | ...; ...; ... |
| Am-1 | Cm-1,1,m |

...

Cm-1,2,m

ACTIVE MIMO ANTENNA CONFIGURATION FOR MAXIMIZING THROUGHPUT IN MOBILE DEVICES

CROSS-REFERENCE TO RELATED APPLICATIONS

This application is a continuation in part (CIP) of U.S. Ser. No. 14/560,173, filed Dec. 4, 2014, and titled "ACTIVE MIMO ANTENNA CONFIGURATION FOR MAXIMIZING THROUGHPUT IN MOBILE DEVICES";

which is a continuation (CON) of U.S. Ser. No. 13/674,115, filed Nov. 12, 2012, and titled "ACTIVE MIMO ANTENNA CONFIGURATION FOR MAXIMIZING THROUGHPUT IN MOBILE DEVICES", now U.S. Pat. No. 8,928,541;

which said Ser. No. 13/674,115 is a CIP of U.S. Ser. No. 13/029,564, filed Feb. 17, 2011, and titled "ANTENNA AND METHOD FOR STEERING ANTENNA BEAM DIRECTION", now U.S. Pat. No. 8,362,962; which is a CON of U.S. Ser. No. 12/043,090, filed Mar. 5, 2008, titled "ANTENNA AND METHOD FOR STEERING ANTENNA BEAM DIRECTION", now issued as U.S. Pat. No. 7,911,402; and which said Ser. No. 13/674,115 is a CIP of U.S. Ser. No. 13/227,361, filed Sep. 7, 2011, and titled "MODAL ANTENNA WITH CORRELATION MANAGEMENT FOR DIVERSITY APPLICATIONS";

the contents of each of which are hereby incorporated by reference.

BACKGROUND OF THE INVENTION

Field of the Invention

This invention relates generally to the field of wireless communication. In particular, the invention relates to Multiple Input Multiple Output (MIMO) antenna implementations capable of improved data throughput performance for use in such wireless communications.

Description of the Related Art

Commonly owned U.S. Pat. No. 7,911,402 describes a beam steering technique wherein a single antenna is capable of generating multiple radiating modes; the entire contents of which are hereby incorporated by reference. The multiple modes are effectuated with the use of offset parasitic elements that alter the current distribution on the driven antenna as the reactive load on the parasitic is varied. This beam steering technique where multiple modes are generated is referred to as a modal antenna technique, and an antenna configured to alter radiating modes in this fashion will be referred to here as a modal antenna.

A receive diversity application using modal antennas as described in commonly owned U.S. Ser. No. 13/227,361, filed Sep. 7, 2011, and titled "MODAL ANTENNA WITH CORRELATION MANAGEMENT FOR DIVERSITY APPLICATIONS"; wherein a single modal antenna can be configured to generate multiple radiating modes to provide a form of switched diversity; the entire contents of which are hereby incorporated by reference. Certain benefits of this technique include the reduced volume required in the mobile device for a single antenna instead of a two antenna receive diversity scheme, reduction in receive ports on the transceiver from two to one, and the resultant reduction in current consumption from this reduction in receive ports.

With MIMO (Multiple Input Multiple Output) systems becoming more prevalent in the access point and cellular communication fields, the need for two or more antennas collocated in a mobile device or small form factor access point are becoming more common. These groups of antennas in a MIMO system need to have high, and preferably, equal efficiencies along with good isolation and low correlation. For handheld mobile devices the problem is exacerbated by antenna detuning caused by the multiple use cases of a device: hand loading of the cell phone, cell phone placed to user's head, cell phone placed on metal surface, etc. For both cell phone and access point applications, the multipath environment is constantly changing, which impacts throughput performance of the communication link.

SUMMARY OF THE INVENTION

An active antenna system and algorithm provides for dynamic tuning and optimization of antenna system parameters for a MIMO system that will provide for greater throughput. As one or multiple antennas are loaded or de-tuned due to environmental changes, corrections to correlation and/or isolation are made by tuning the active antenna. A null-steering technique is implemented to alter the near-field and far-field characteristics to aid in modifying correlation and isolation in the multi-antenna system.

In one embodiment, an active MIMO antenna system comprises: a first active modal antenna capable of selective operation about a plurality of modes, wherein each of said plurality of modes generates a distinct antenna radiation pattern resulting from the first active modal antenna; a second antenna; each of the first active modal antenna and the second antenna being individually coupled to a respective transceiver selected from a first and second transceiver; and a processor coupled to at least the first active modal antenna and configured to select the mode from the plurality of modes associated with the first modal antenna such that correlation of the two antenna system is altered for optimal performance.

In another embodiment, the second antenna is an active modal antenna capable of selective operation about a plurality of modes, wherein each of said plurality of modes generates a distinct antenna radiation pattern resulting from the first active modal antenna; the processor is further coupled to the second modal antenna and configured to select the mode from the plurality of modes associated with the second modal antenna such that the correlation of the two-antenna system is altered for optimal performance.

In another embodiment, the first active modal antenna comprises: a radiating structure disposed above a circuit board and forming an antenna volume therebetween; a parasitic element positioned adjacent to the radiating structure; and an active element coupled to the parasitic element; wherein said active element is configured for one or more of: adjusting a reactance of the parasitic element, or shorting the parasitic element to ground.

In certain embodiments, the active elements may individually comprise: a voltage controlled tunable capacitor, voltage controlled tunable phase shifter, field-effect transistor (FET), tunable inductor, switch, or any combination thereof.

In another embodiment, the active MIMO antenna comprises three or more antennas.

In some embodiments, at least one passive antenna having a fixed radiation pattern.

In another embodiment, an active MIMO antenna system comprises: three or more active modal antennas, each of the active modal antennas being adapted for operation at a plurality of antenna modes, and each of said antenna modes having a distinct antenna radiation pattern. A processor coupled to the modal antennas and configured to select a mode from the plurality of modes associated with each of the modal antennas such that the correlation of the multi-antenna system is altered for optimal performance.

In certain embodiments, one or more of the antennas of the active MIMO antenna system comprises a passive antenna with a fixed radiation pattern.

In yet another embodiment, an active MIMO antenna system comprises: a plurality of antennas, each of the antennas configured to produce a distinct radiation pattern with respect to each other; one or more of said plurality of antennas comprising an active modal antenna configured for multimode operation, wherein the active modal antenna comprises a distinct radiation pattern in each of the multiple modes; and a processor configured to select the mode of the one or more active modal antennas by sending control signals to respective active elements; wherein the active MIMO antenna system is adapted to optimize correlation of the antenna system for optimal antenna performance.

BRIEF DESCRIPTION OF THE DRAWINGS

The invention can be further understood upon review of the following detailed description in conjunction with the appended drawings, wherein.

DETAILED DESCRIPTION OF THE PREFERRED EMBODIMENTS

Figure 1:
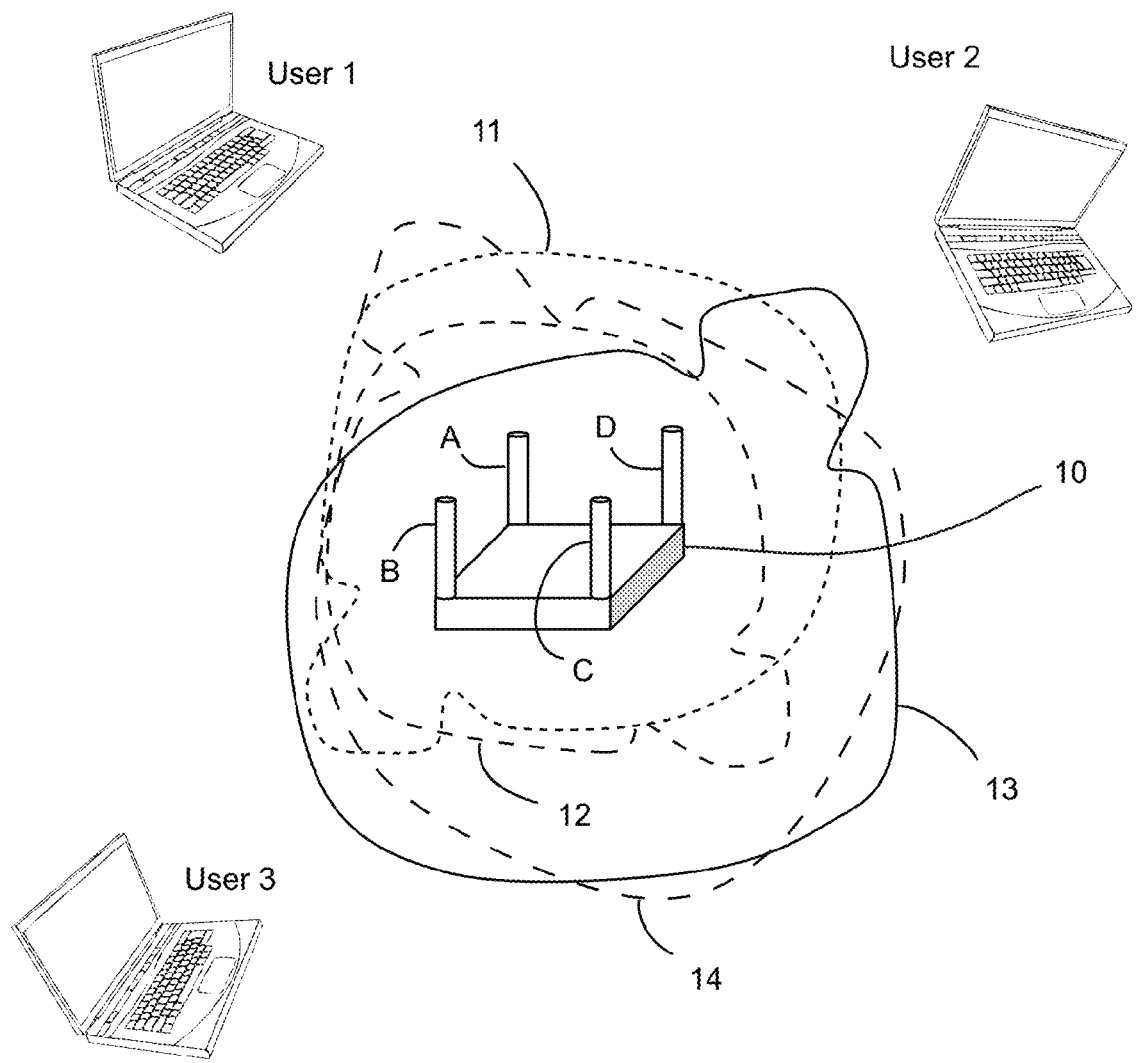
FIG. 1 illustrates a four antenna Multi-Input Multi-Output (MIMO) antenna system in an access point, wherein the antennas comprise passive antenna structures with fixed radiation patterns.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Commonly owned, U.S. Pat. No. 7,911,402, titled "ANTENNA AND METHOD FOR STEERING ANTENNA BEAM DIRECTION", and U.S. Pat. No. 7,830,320, titled "ANTENNA WITH ACTIVE ELEMENTS", disclose antenna systems capable of beam steering, band switching, active matching, and other active tunable characteristics; the contents of each of which are hereby incorporated by reference. These antennas utilize a radiating element and one or more parasitic elements coupled to active elements in a manner for enabling switching, variable reactance, and other tuning of the antenna components. The resulting structure is an active tunable antenna capable of operating in multiple modes, otherwise termed an "active modal antenna" or "modal antenna". The referenced patents disclose active modal antennas and thus details of these structures will not be discussed in detail herein.

An "active modal antenna" as referred to herein includes an antenna capable of selective operation about a plurality of modes, wherein each of said plurality of modes generates a distinct antenna radiation pattern resulting from the first active modal antenna. In this regard, the active modal antenna can be reconfigured as necessary to provide an optimal radiation pattern. This is accomplished by one or more of: band-switching, beam steering, and active impedance matching as environmental effects detune the antenna. In representative examples, an active modal antenna comprises a radiating structure disposed above a circuit board and forming an antenna volume therebetween; a parasitic element positioned adjacent to the radiating structure; and an active element coupled to the parasitic element; wherein the active element is configured for one or more of: adjusting a reactance of the parasitic element, or shorting the parasitic element to ground.

As referenced herein, an "active element" may comprise at least one of: a voltage controlled tunable capacitor, voltage controlled tunable phase shifter, field-effect transistor (FET), tunable inductor, switch, or any combination thereof.

In certain embodiments, an antenna system comprises: a first active modal antenna adapted for operation at a plurality of antenna modes, each of the antenna modes having a distinct antenna radiation pattern; a second antenna with a fixed radiation pattern; and a processor coupled to the first modal antenna and configured to select the mode from the plurality of modes associated with the modal antenna such that the correlation of the two antenna system is altered for optimal performance.

In other embodiments, the second antenna comprises an active modal antenna adapted for operation at a plurality of antenna modes, each of the antenna modes having a distinct antenna radiation pattern; and a processor is coupled to the first and second modal antennas and configured to select each mode from the plurality of modes associated with the modal antennas such that the correlation of the two antenna system is altered for optimal performance.

In another embodiment, the active modal antenna may further comprise a primary radiator, at least one parasitic element disposed adjacent to the primary radiator, and one or more active elements coupled to the at least one parasitic element; wherein the modal antenna is adapted to switch between two or more antenna modes by actively adjusting said at least one parasitic element and one or more active elements coupled therewith. The active elements can be used to vary a reactance on the parasitic element for causing a frequency shift, or rotation of the antenna radiation pattern depending on location of the parasitic element relative to the antenna radiator.

In certain embodiments, an antenna system comprises: three or more modal device antennas, each adapted for operation at a plurality of antenna modes, each of said antenna modes having a distinct antenna radiation pattern; and a processor coupled to the modal antennas and configured to select the mode from the plurality of modes associated with the modal antennas such that the correlation of the multi-antenna system is altered for optimal performance.

In various embodiments, one or more of the multiple antenna radiators is not a modal antenna and may comprise any passive antenna radiator in the art.

Now turning to the drawings, FIG. 1 illustrates a wireless access point 10 with a four-antenna Multiple Input Multiple Output (MIMO) system, the four antennas labeled as A; B; C; D, respectively. The access point 10 is used to communicate with multiple wireless users simultaneously, with three users shown (User 1; User 2; and User 3). The radiation patterns for each of the respective four antennas of the MIMO antenna system are denoted as 11; 12; 13 and 14, respectively. Because the antennas are passive, the respective radiation patterns are fixed.

Figures 2A, 2B, 2C:
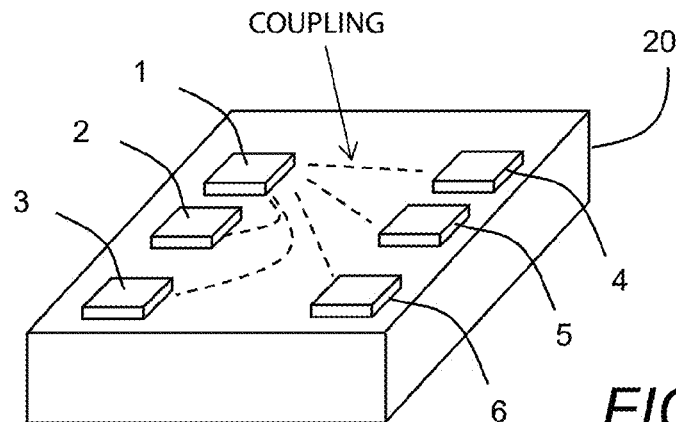
FIGS. 2(A-C) illustrate a correlation matrix for six antennas in a MIMO system, each of the antennas is configured for a single radiating mode.

FIG. 2A illustrates a six-antenna MIMO system integrated into the wireless access point 20. The antennas are conventional, passive antennas, with each antenna possessing a single radiation pattern or mode. The six antennas are labeled 1; 2; 3; 4; 5; and 6, respectively. FIG. 2B shows a chart indicating a single radiating mode for each passive antenna of the six antennas. In FIG. 2C, a correlation matrix is shown for the six-antenna system, with the correlation between antennas being characterized by a fifteen-value matrix.

Figure 3:
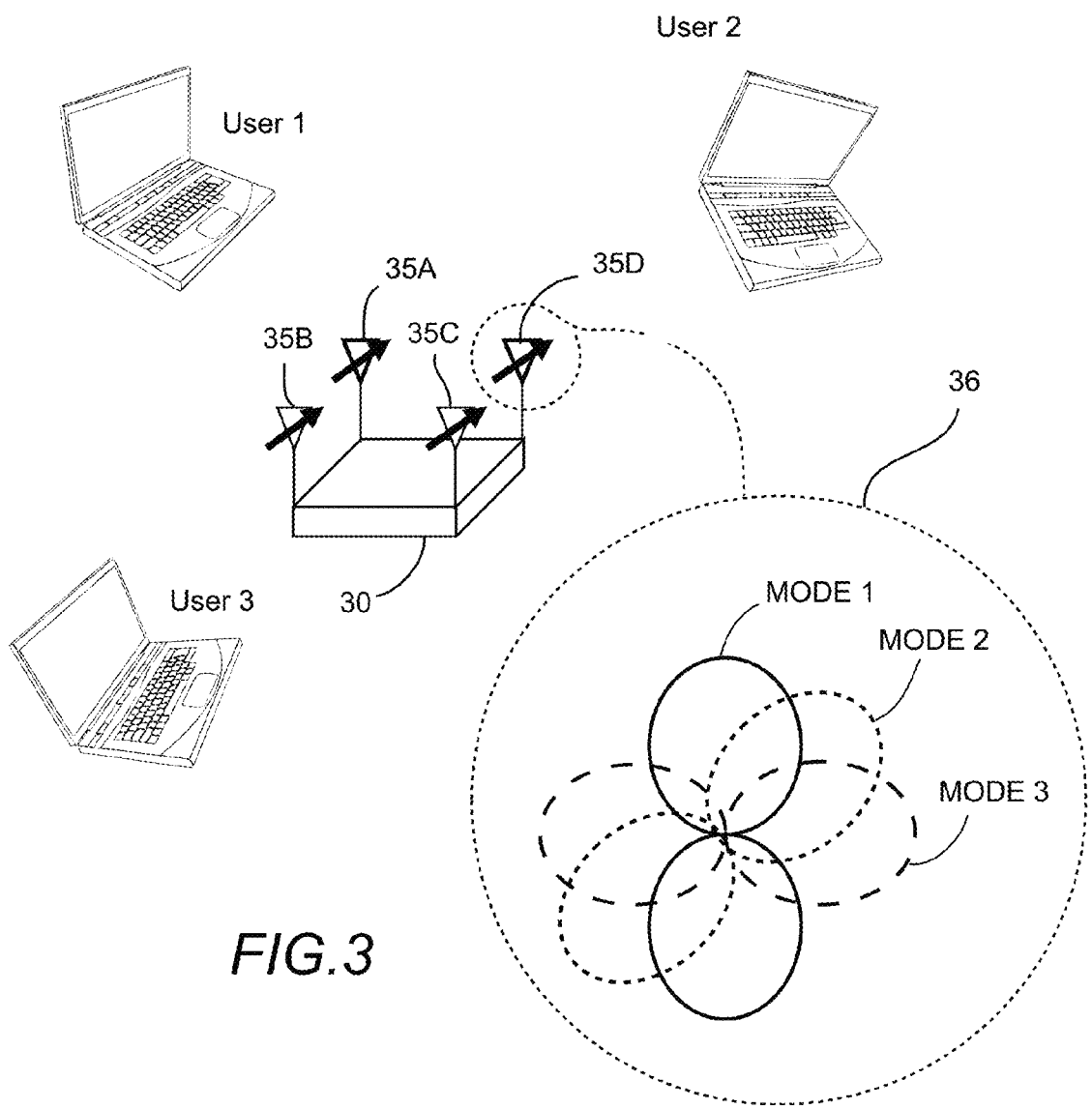
FIG. 3 illustrates a four antenna MIMO antenna system, each of the four antennas comprises "n" modes of operation, wherein the antenna produces a distinct radiation pattern at each of the "n" modes.

FIG. 3 illustrates a wireless access point 30 with a four-antenna MIMO system, with the four antennas being active modal antennas 35(A-D), respectively. Each modal antenna is capable of generating several unique radiation patterns or modes. Three radiation patterns or modes (MODE 1; MODE 2; MODE 3) are shown for one of the antennas in breakout view 36. As further illustrated in FIG. 3, an access point 30 comprising one or more modal antennas will be adapted for multiple modes (represented as "n" modes herein), wherein each of the "n" antenna modes generates a distinct radiation pattern.

Figures 4A, 4B, 4C:
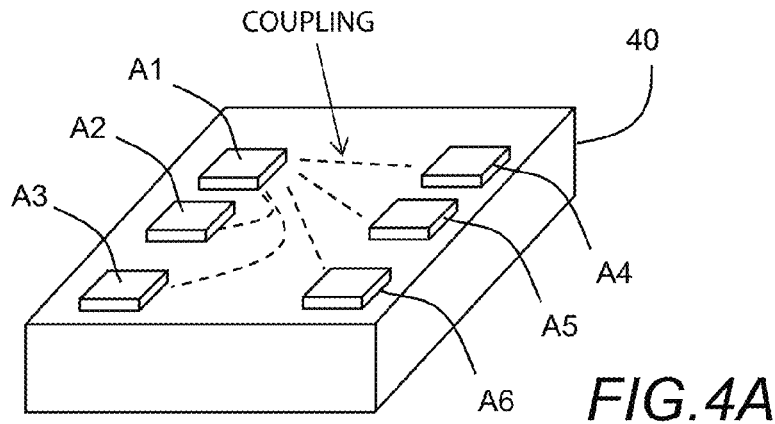
FIGS. 4(A-C) illustrate a correlation matrix for six antennas in a MIMO system, each of the antennas is configured for operation at two distinct radiating modes.

FIG. 4 illustrates a six-antenna MIMO system integrated into the wireless access point 40. The antennas are active modal antennas, labeled A1; A2; A3; A4; A5; and A6, respectively, where each modal antenna is capable of generating two radiation patterns or modes. In this example, as illustrated in FIG. 4B, each modal antenna is capable of generating two modes; for example antenna A1 can generate Modes A1,1 and A1,2. FIG. 4C shows a correlation matrix for the six-antenna system, each antenna having two respective modes, with the correlation between antennas being characterized by a thirty-value matrix. It should be recognized that the modal antennas can be configured for up to "n" modes, where "n" is an integer between one and infinity. Thus, the correlation matrix will be increased with the number of antenna modes provided by the active modal antennas.

Figures 5A, 5B, 5C:
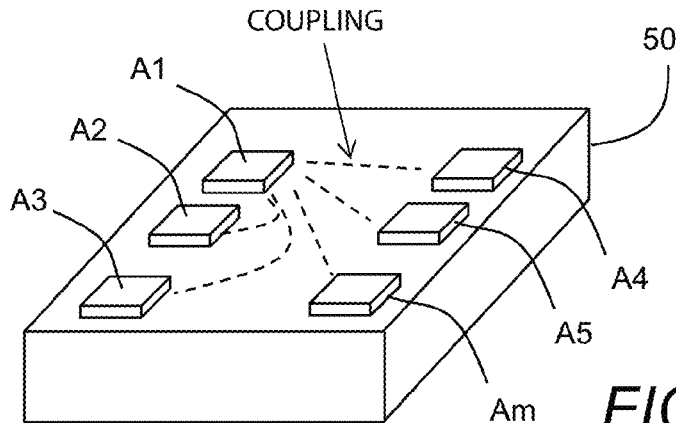
FIGS. 5(A-C) illustrate a correlation matrix for "m" antennas in a MIMO system, each of the antennas is configured for operation at "n" distinct radiating modes.

FIG. 5 illustrates an "m"-antenna MIMO system integrated into the wireless access point; the antennas are labeled A1 thru Am, respectively. In accordance with FIG. 5B, the antennas are active modal antennas, where each modal antenna is capable of generating a plurality of modes, or "n" respective radiation patterns or modes. FIG. 5C shows a correlation matrix is shown for the "m" modal antenna system.

Figure 6:
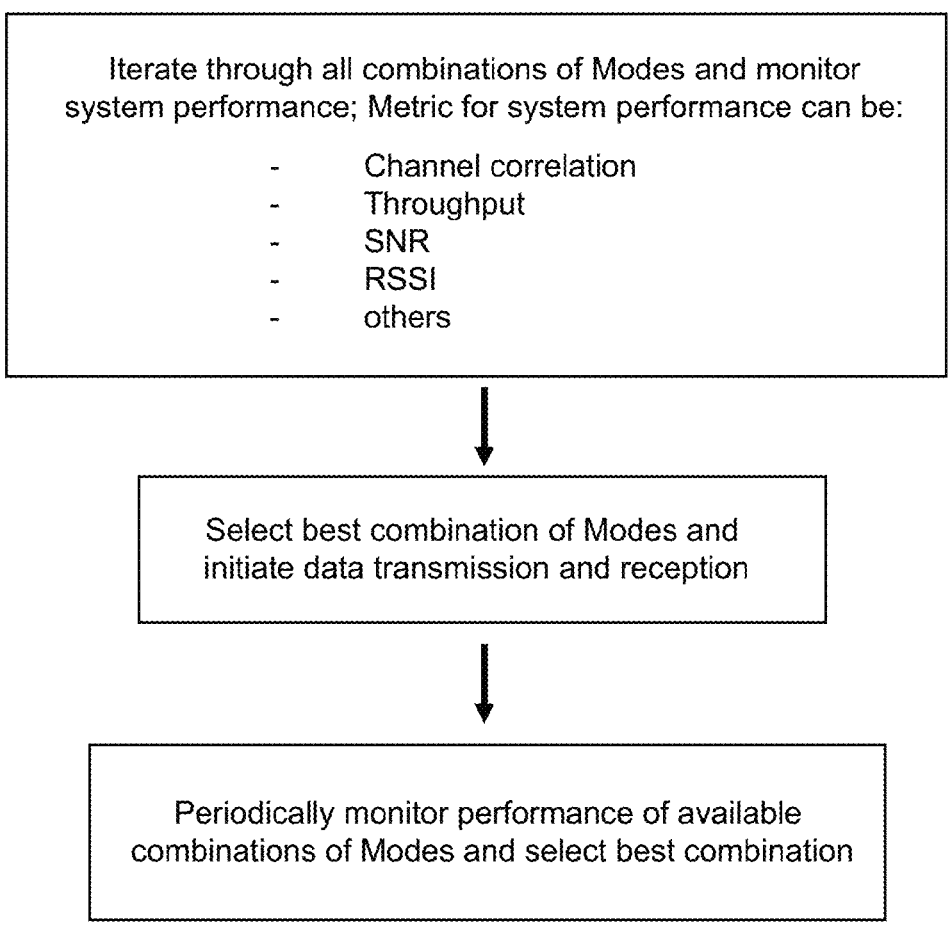
FIG. 6 illustrates a process for selecting the optimal set of modes from an antenna system containing one or more active modal antennas.

FIG. 6 illustrates a process used to select the optimal set of modes from an antenna system containing one or multiple Modal antennas. The process includes: (i) iterating through all combinations of Modes and monitor system performance; the metric for system performance can be any of: channel correlation; throughput; signal to noise ratio (SNR); received signal strength indicator (RSSI); among others; (ii) selecting the best combination of Modes and initiate data transmission and reception; and (iii) periodically monitoring performance of available combinations of Modes and select a best combination.

Figure 7:
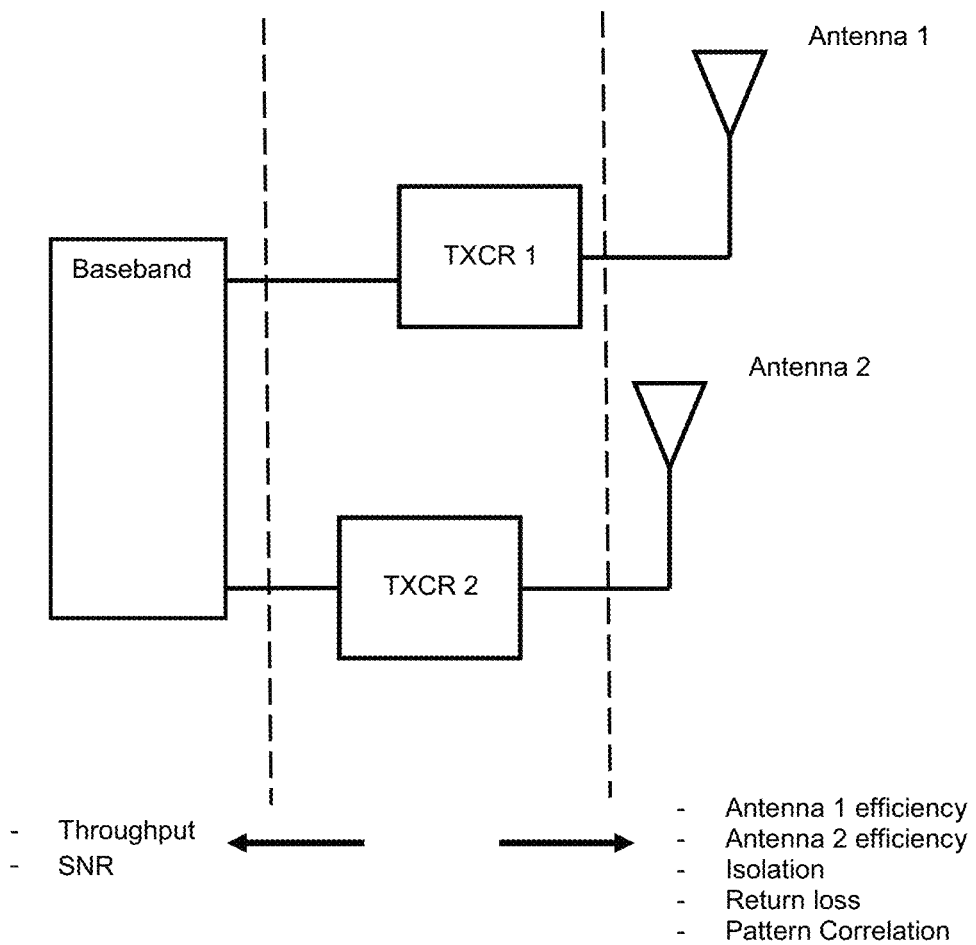
FIG. 7 illustrates a two antenna system where the antennas are conventional, passive antennas.

FIG. 7 illustrates a two antenna system where the antennas are conventional, passive antennas. Antenna 1 is connected to transceiver 1 (TXCR 1), and antenna 2 is connected to transceiver 2 (TXCR 2). A baseband processor interfaces with the pair of transceivers. With antennas 1 and 2 being passive antennas, parameters such as efficiency, isolation, return loss, and correlation are fixed and cannot be adjusted dynamically to optimize for different use conditions or changes to the multipath environment. These parameters vary as a function of local environment, i.e. hand loading of the device. System throughput and SNR varies and can degrade as the environment changes.

Figure 8A:
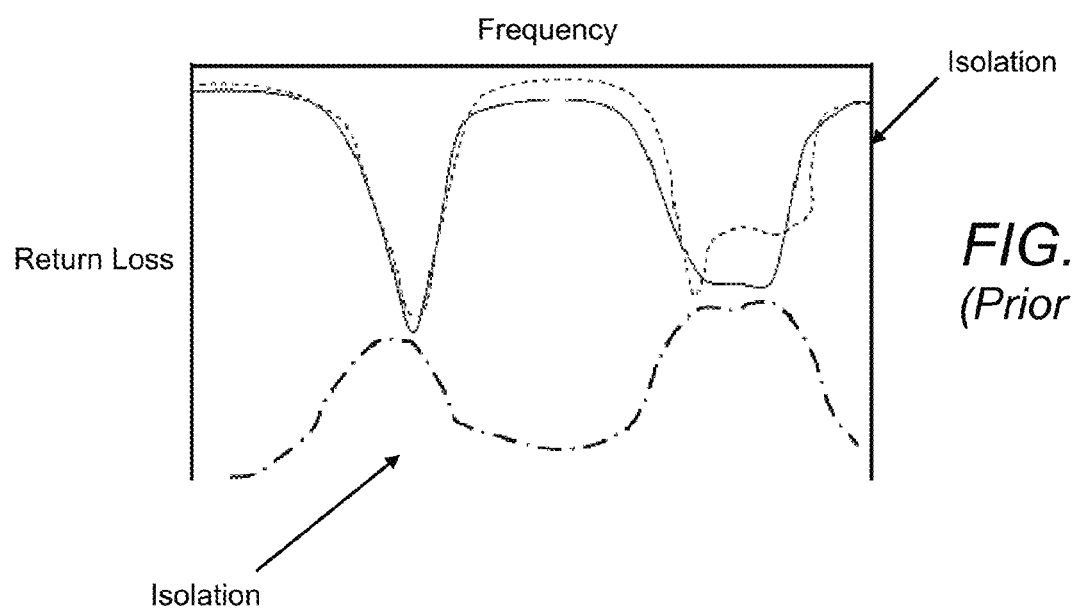
FIGS. 8(A-B) illustrate plots of return loss, isolation, and correlation for a two antenna system as illustrated in FIG. 7.
Figure 8B:
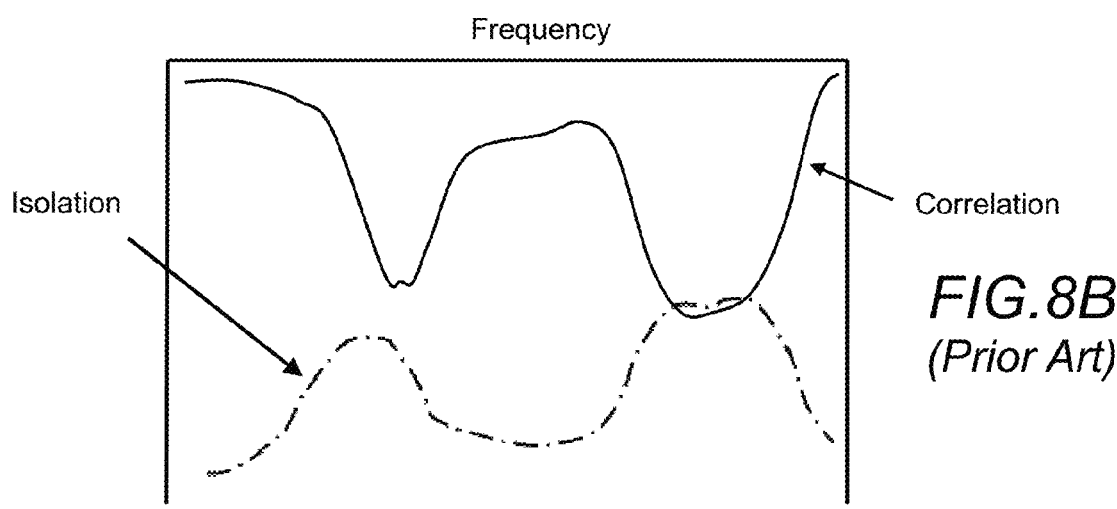

FIGS. 8(A-B) illustrate plots of return loss, isolation, and correlation for a two antenna system as illustrated in FIG. 7. The two antennas are passive which results in a fixed response of these parameters as a function of frequency.

Figure 9:
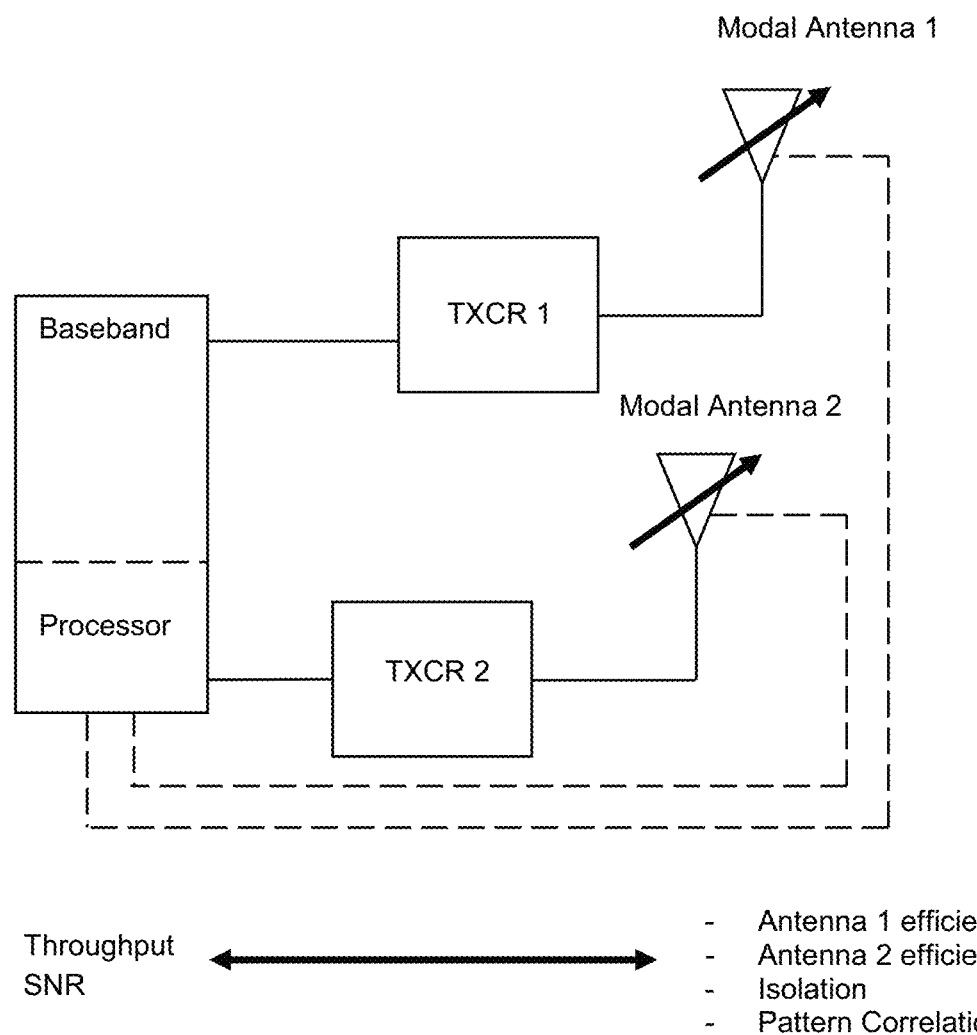
FIG. 9 illustrates a two antenna system where the antennas are active modal antennas.

FIG. 9 illustrates a two antenna system where the antennas are active modal antennas. Modal antenna 1 is connected to transceiver 1 (TXCR1), and modal antenna 2 is connected to transceiver 2 (TXCR2). A baseband processor interfaces with the pair of transceivers and also provides control signals to modal antennas 1 and 2. With antennas 1 and 2 being modal antennas, parameters such as efficiency, isolation, return loss, and correlation can be adjusted dynamically to optimize for different use conditions or changes to the multipath environment. Thus, the active Modal two antenna system has variable efficiency, isolation, and pattern correlation. Dynamic optimization of pattern correlation and isolation results in improved system throughput and SNR.

Figure 10A:
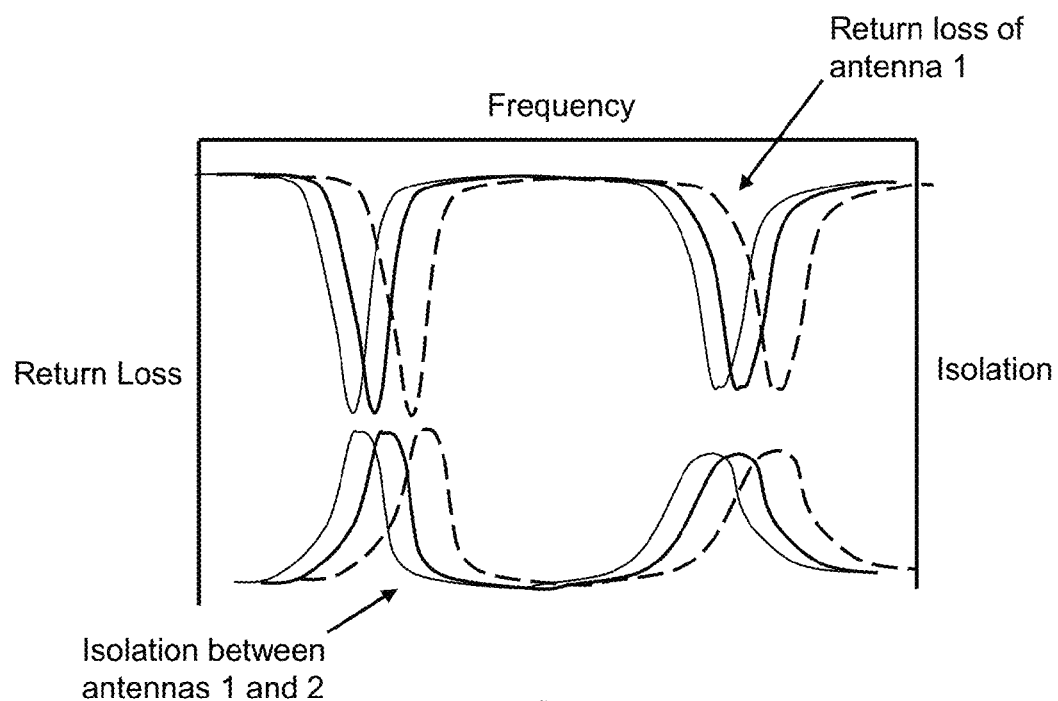
FIG. 10(A-B) illustrate plots of return loss, isolation, and correlation for a two active modal antenna system of FIG. 9.
Figure 10B:
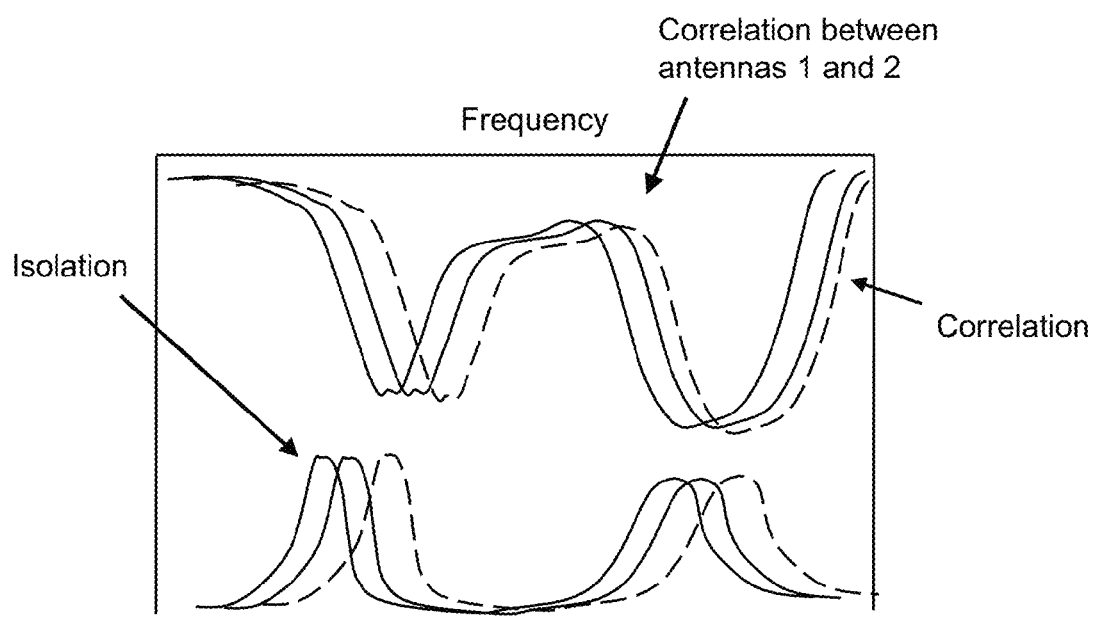

FIGS. 10(A-B) illustrate plots of return loss, isolation, and correlation for a two antenna system of FIG. 9. The two antennas are modal antennas which results in multiple responses of these parameters being available for selection to provide the ability to dynamically adjust antenna system performance to optimize for different use conditions or changes to the multipath environment. Multiple tuning states from Modal antennas provide dynamic tuning capabilities, where correlation and isolation can be varied.

Figure 11:
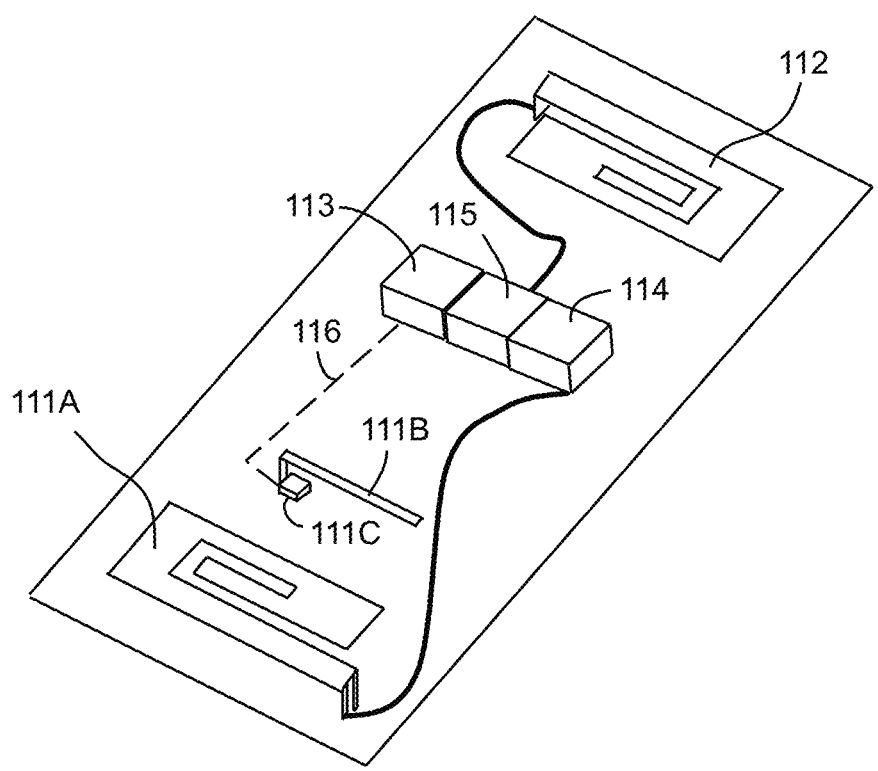
FIG. 11 illustrates a two antenna system wherein a first antenna is an active modal antenna and a second antenna is a conventional, passive antenna.

FIG. 11 illustrates a two-antenna system where antenna 111 is a modal antenna and antenna 112 is a conventional, passive antenna. Antenna 111 is connected to a first transceiver 114 and antenna 112 is connected to a second transceiver 115. Modal antenna 111 includes a parasitic element 111b positioned near a radiator element 111A, and an active tuning element 111C is associated with the parasitic element. A processor 113 provides control signals 116 to the active tuning element 111C for configuring one of several modes of the modal antenna 111.

Figure 12:
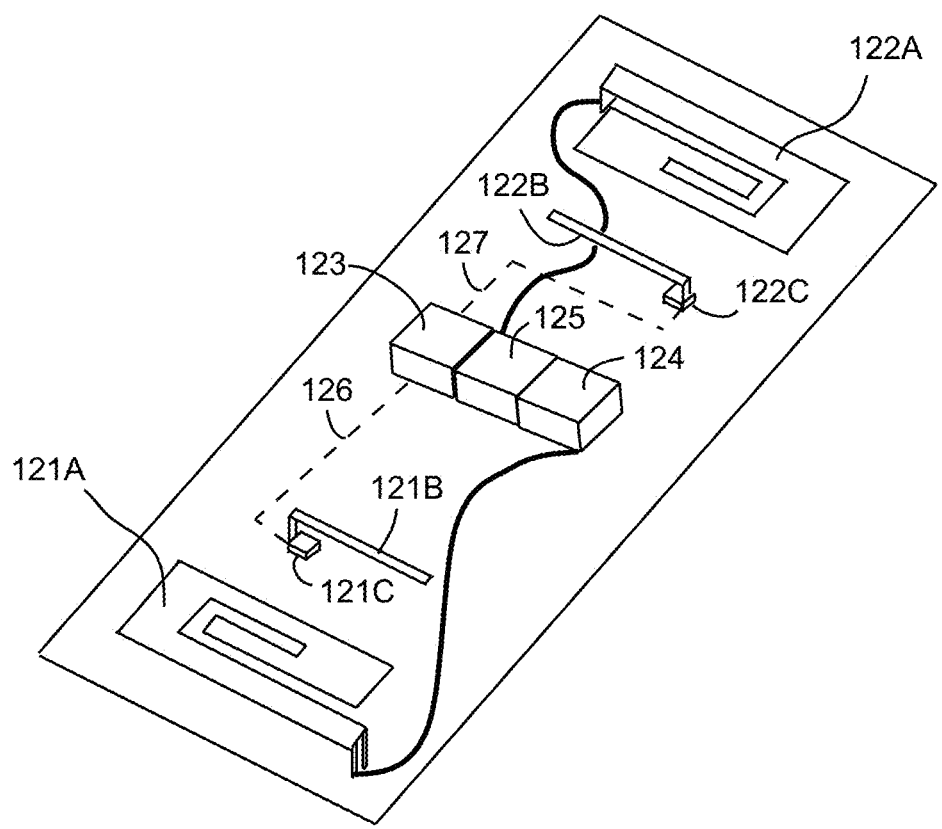
FIG. 12 illustrates a two antenna system wherein the first and second antennas are both active modal antennas.

FIG. 12 illustrates a two-antenna system where both antennas 121 and 122 are modal antennas. Modal antenna 121 is connected to a first transceiver 124 and modal antenna 122 is connected to a second transceiver 125. Each of the modal antennas comprises a radiator 121A; 122A positioned adjacent to a parasitic element 121B; 122B, respectively, and an active tuning element 121C; 122C associated with the respective parasitic element. A processor 123 provides control signals 126; 127 to the modal antennas.

Figure 13:
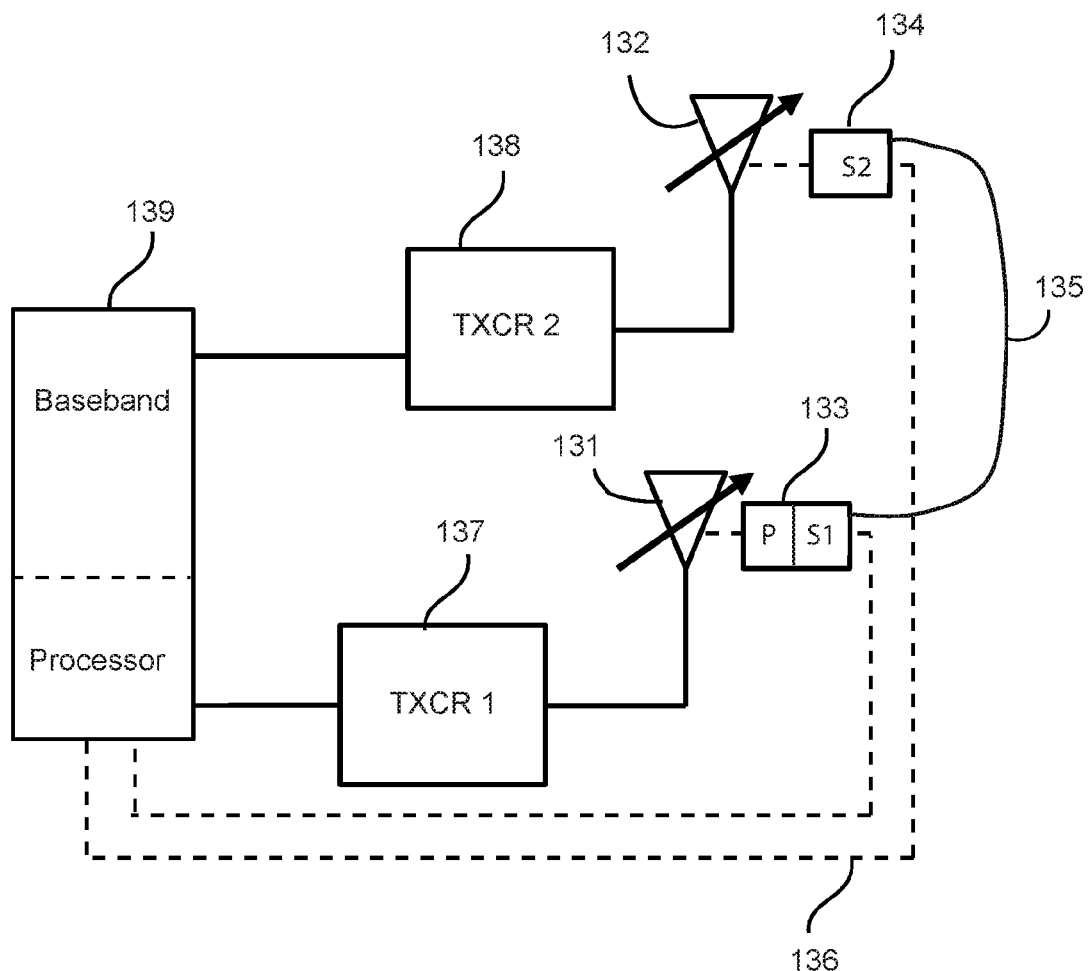
FIG. 13 illustrates a two antenna system wherein the first and second antennas are both active modal antennas and a first of the modal antennas is coupled to a processor and first switch for controlling a second switch associated with a second of the modal antennas.

FIG. 13 illustrates a two antenna system where each of the antennas include active modal antennas. A first modal antenna 131 is connected to a first transceiver (TXCR1) 137, and a second modal antenna 132 is connected to a second transceiver (TXCR2) 138. The first modal antenna 131 is further coupled to a first RF switch (S1) 133 for configuring a mode of the first modal antenna. The second modal antenna is further coupled to a second RF switch (S2) 134 for configuring a mode of the second modal antenna. In the illustrated example, a first processor (P) and the first RF switch (S1) are each housed in an RF integrated circuit module 133 positioned adjacent to the first modal antenna 131. A baseband processor 139 interfaces with the pair of transceivers 137; 138 and also provides signal information to the RF integrated circuit module 133 and second switch 134. A transmission line 135 is shown extending between the RF integrated circuit module 133 and the second RF switch 134, wherein the RF integrated circuit module 133 is configured to send control signals to the second RF switch 134 for configuring the second modal antenna in a preferred configuration mode.

The signal information can be in the form of received signal strength indicator (RSSI) data or error vector magnitude (EVM) data.

The processor is coupled to memory containing an algorithm configured to: sample the signal information received from a baseband processor of the antenna system, select a preferred configuration for each of the first and second modal antennas based on the signal information; and communicate control signals to the first and second RF switches for implementing the preferred configuration of the antenna system.

The preferred configuration includes each of the modal antennas being selected in a respective mode that yields optimum data throughput. The first processor is used to set the preferred mode for each of the first and second modal antennas.

The preferred mode can be selected based on the optimum data throughput amongst a plurality of client devices on a communication link. For example, the preferred mode can be a configuration of the first and second modal antenna which yields equal and optimum performance for each of the client devices; or alternatively, the preferred mode can be that which yields the optimum data throughput for one or more preferred clients on the communication link.

Figure 14:
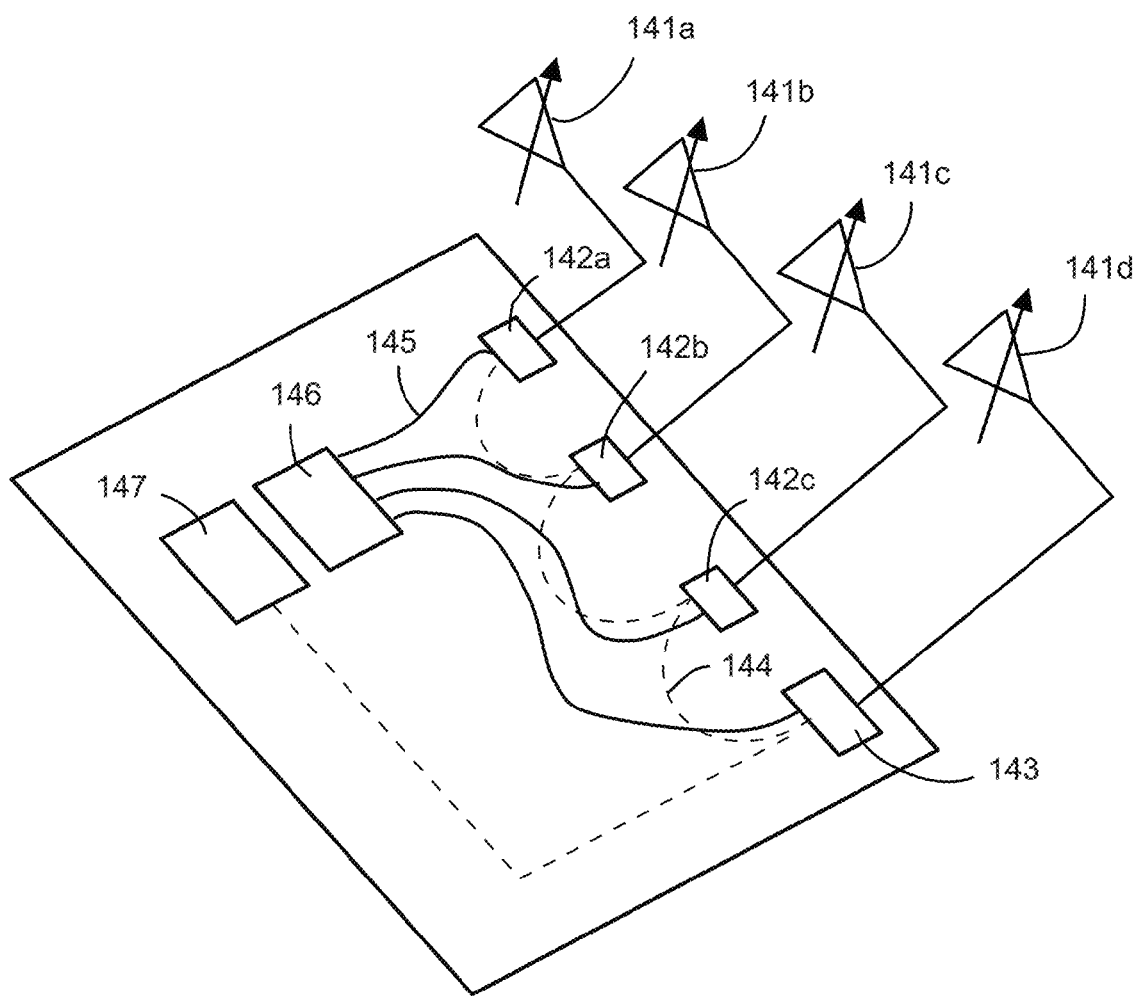
FIG. 14 illustrates a 4×4 modal antenna MIMO configuration with respective switches for configuring the antenna.

FIG. 14 illustrates a four by four MIMO antenna system having a first modal antenna 141a; a second modal antenna 141b; a third modal antenna 141c; and a fourth modal antenna 141d. The fourth modal antenna 141d is shown coupled to an RF integrated circuit module 143 containing a first processor, memory, and a first RF switch. The first RF switch of the module 143 is coupled to a transceiver 146 via a trace or other transmission line. Each of the first thru third modal antennas 141a; 141b; 141c, are connected to one of a plurality of RF switches 142a; 142b; 142c, respectively. Each of the plurality of RF switches is further connected to the transceiver 146. A baseband processor 147 is connected to the RF integrated circuit model 143 for communicating signal information. The first processor of the RF integrated circuit module 143 processes the signal information in accordance with a resident algorithm to determine a control state for controlling each of the RF switches for configuring the respective modal antennas in a preferred mode. The first processor samples a signal metric against stored antenna mode information to determine a preferred mode, then communicates signals to the RF switches to cause each modal antenna to be set in the preferred configuration mode. Dashed lines show transmission lines extending between the baseband processor and the RF integrated circuit module; and further show connection lines between the RF integrated circuit module and each respective RF switch.

Other variations will be recognized by those having skill in the art.

What is claimed is:

1. An active MIMO antenna system, comprising:
a first modal antenna adapted for selective operation about a plurality of first modes thereof, wherein the first modal antenna is adapted to provide a distinct antenna radiation pattern in each of said plurality of first modes;
a first RF switch coupled to the first modal antenna, wherein the first RF switch is adapted to configure the first modal antenna in one of the plurality of first modes;
a second modal antenna adapted for selective operation about a plurality of second modes thereof, wherein the second modal antenna is adapted to provide a distinct antenna radiation pattern in each of said plurality of second modes;
a second RF switch coupled to the second modal antenna, wherein the second RF switch is adapted to configure the second modal antenna in one of the plurality of second modes;
a first processor coupled to each of the first and second RF switches, the first processor being configured to execute an algorithm to perform the steps of:
sampling signal information received from a baseband processor of the antenna system,
selecting a preferred configuration for each of the first and second modal antennas based on the signal information; and
communicating control signals to the first and second RF switches for implementing the preferred configuration of the first and second modal antennas; and
a baseband processor coupled to each of the first and second transceivers for communicating radiofrequency (RF) signals therebetween, the baseband processor being further coupled to the first processor for communicating said signal information.

2. The active MIMO antenna system of claim 1, wherein:
the first active modal antenna comprises:
a radiating structure disposed above a circuit board and forming an antenna volume therebetween;
a parasitic element positioned adjacent to the radiating structure; and
an active element coupled to the parasitic element;
wherein said active element is configured for one or more of: adjusting a reactance of the parasitic element, or shorting the parasitic element to ground.

3. The active MIMO antenna system of claim 2, wherein the active element comprises: a voltage controlled tunable capacitor, voltage controlled tunable phase shifter, field-effect transistor (FET), tunable inductor, switch, or any combination thereof.

4. The active MIMO antenna system of claim 1, comprising three or more antennas.

5. The active MIMO antenna system of claim 4, comprising at least one passive antenna having a fixed radiation pattern.

6. The active MIMO antenna system of claim 4, wherein: each of the three or more antennas is coupled to a respective RF switch, and further coupled to the first processor.

7. The active MIMO antenna system of claim 1, wherein: said first processor and said first RF switch are each contained in an RF integrated circuit module.

8. The active MIMO antenna system of claim 7, wherein: the RF integrated circuit module is positioned adjacent to the first modal antenna.

9. The active MIMO antenna system of claim 7, wherein: the first processor of the RF integrated circuit module is coupled to the second RF switch via a transmission line extending therebetween.

10. The active MIMO antenna system of claim 1, wherein: said signal information comprises received signal strength indicator (RSSI) data received from the baseband processor.

11. The active MIMO antenna system of claim 1, wherein: said signal information comprises error vector magnitude (EVM) data received from the baseband processor.

12. The active MIMO antenna system of claim 1, wherein: said preferred configuration includes each of the modal antennas being selected in a respective mode that yields optimum data throughput.

13. The active MIMO antenna system of claim 1, wherein: said signal information comprises one of: received signal strength indicator (RSSI) or error vector magnitude (EVM) data received from the baseband processor; the signal information is surveyed from a plurality of client devices; and said preferred configuration includes each of the modal antennas being selected in a respective mode that yields optimum data throughput across the plurality of client devices.

14. The active MIMO antenna system of claim 13, wherein: the algorithm is configured to select a preferred mode to provide equal throughput performance to each of the plurality of client devices.

15. The active MIMO antenna system of claim 13, wherein: the algorithm is configured to select a preferred mode to provide optimum throughput performance to one or more preferred client devices of the plurality of client devices.

16. The active MIMO antenna system of claim 1, wherein: said signal information comprises error vector magnitude (EVM) data received from the baseband processor.

17. The active MIMO antenna system of claim 1, wherein: said preferred configuration includes each of the first and second modal antennas being selected in a respective mode that yields optimum data throughput.

18. An RF integrated circuit module for integration with an active MIMO antenna system having a first modal antenna and a second modal antenna, the RF integrated circuit module comprising:
a first RF switch configured to be coupled to the first modal antenna, the first RF switch adapted to configure a mode of the first modal antenna; and
a first processor, the first processor coupled to the first RF switch and further configured to be coupled to one or more second RF switches;
wherein the first processor is configured to execute an algorithm to perform the steps of:
sampling signal information received from a baseband processor of the antenna system,
selecting a preferred configuration for each of the first and second modal antennas based on the signal information; and
communicating control signals to the first and second RF switches for implementing the preferred configuration of the first modal antenna.

19. The active MIMO antenna system of claim 18, wherein:
said signal information comprises received signal strength indicator (RSSI) data received from the baseband processor.

20. An RF integrated circuit module for integration with an active antenna system having a first modal antenna, the RF integrated circuit module comprising:
a first RF switch configured to be coupled to the first modal antenna, the first RF switch adapted to configure a mode of the first modal antenna; and
a first processor, the first processor coupled to the first RF switch;
wherein the first processor is configured to execute an algorithm to perform the steps of:
sampling signal information received from a baseband processor of the antenna system,
selecting a preferred configuration for implementing in the first modal antenna based on the signal information; and
communicating control signals to the first RF switch for implementing the preferred configuration of the first modal antenna.

* * * * *